324-77 CROSS REFERENCE SEARCH ROOM

March 28, 1967 H. W. LORBER 3,311,822

TESTING APPARATUS INCLUDING A PARAMETRIC AMPLIFIER

Filed May 28, 1963

INVENTOR.
HERBERT W. LORBER
BY Vincent L. Carney
O. C. Hodges
ATTORNEYS 3,311,822
TESTING APPARATUS INCLUDING A PARAMETRIC AMPLIFIER

Herbert W. Lorber, Las Vegas, Nev., assignor, by mesne assignments, to the United States of America as represented by the Secretary of the Navy Filed May 28, 1963, Ser. No. 284,301
3 Claims. (Cl. 324—57)

Figures 1, 2:
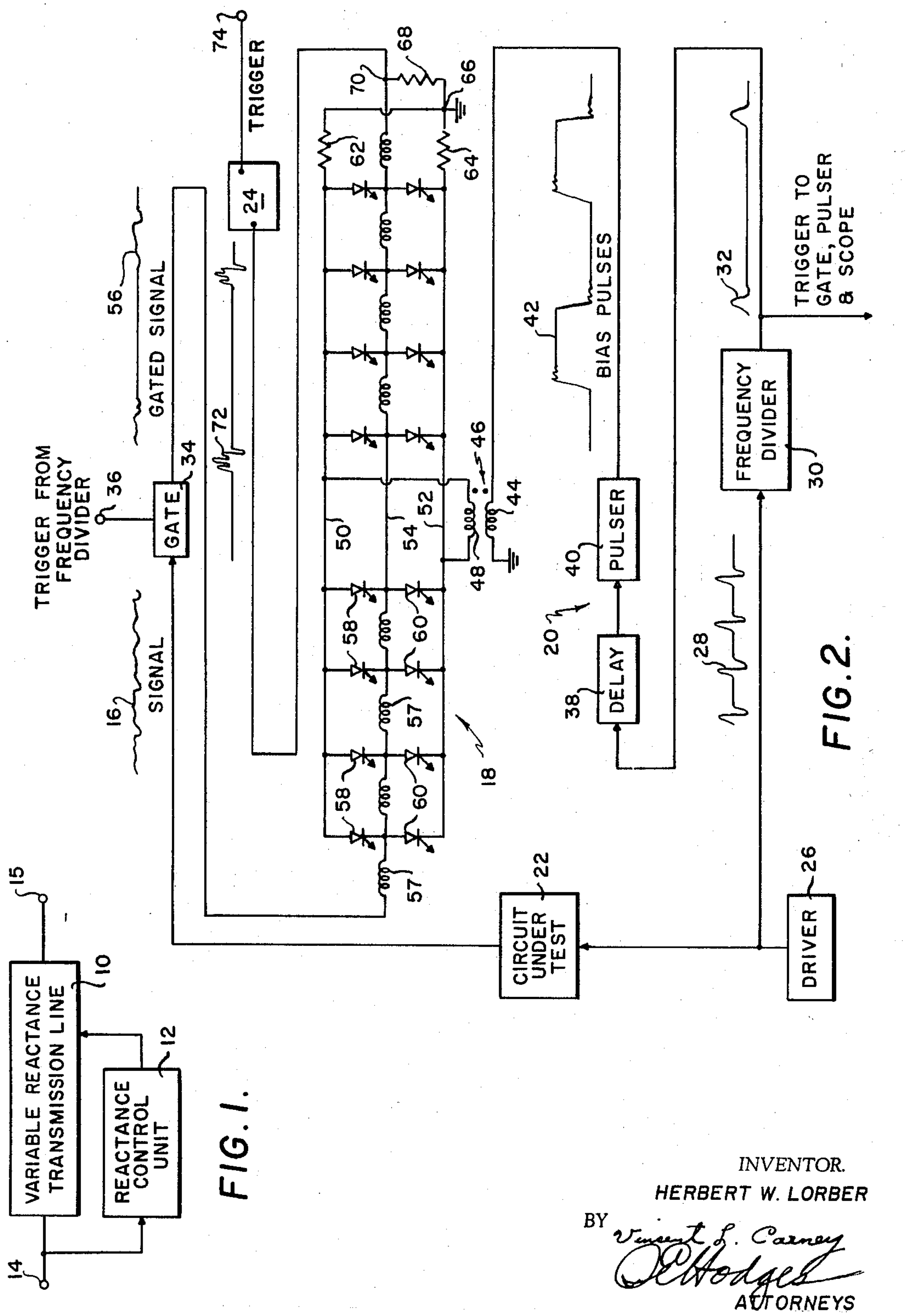

This invention relates to parametric amplification and more particularly relates to a method and apparatus for achieving broadband parametric amplification.

Parametric amplifiers are used at present in systems where a low noise figure is essential for the detection of extremely weak signals. They are particularly useful in the high-frequency range where random atmospheric noise tends to drop below the thermal noise level of more conventional amplifiers.

However, parametric amplifiers are relatively narrow band devices. Parametric amplifiers or Mavar apparatus (modulated amplification through variable reactance) apparatus as they are sometimes called provide amplification by transferring energy from a power wave to a signal wave. The band widths of these devices are narrow because sharply tuned resonant circuits are necessary to support three different frequency waves; the signal waves, the pump wave which supplies the power for amplification, and an idle wave which results from the mixing of the pump wave and the signal wave. Conventionally each of these three waves will have a different frequency. Accordingly, it is an object of this invention to provide an improved parametric amplifier.

It is a further object of this invention to provide a wide band parametric amplifier.

It is a still further object of this invention to provide a parametric amplifier which is suitable for amplifying weak transient signals whose frequency components cover decades.

It is a still further object of this invention to provide a solid-state video parametric amplifier.

Other objects and many of the attendant advantages of this invention will be readily appreciated as the same becomes better understood by reference to the following detailed description when considered in connection with the accompanying drawings wherein:

FIG. 1 is a schematic circuit block diagram of an embodiment of the invention; and FIG. 2 is a more detailed schematic diagram of the same embodiment.

Referring now in particular to FIG. 1 in which a schematic-circuit block diagram of the invention is shown having a variable-reactance transmission line 10 and a reactance control unit 12. An input terminal 14 is electrically connected to the variable reactance transmission line 10 and to the reactive control unit 12. The variable reactance transmission line 10 consists of a uniform transmission line, lumped or distributed with a means for changing its capacitance and/or inductance per unit length simultaneously and uniformly along its length.

The output of the reactance control unit 12 is connected to this means for changing the reactance of the variable reactance transmission line 10 a short period of time after an input signal, applied to terminal 14, enters the variable reactance transmission line. Consequently an input signal applied to terminal 14 enters the variable reactance transmission line 10 at a uniform velocity; the velocity of the signal is then speeded up quickly by a change in the reactance of the variable reactance transmission line 10 under the control of the reactance control unit 12; and the signal then leaves the variable reactance transmission line 10 at a uniform velocity, appearing at the output terminal 15 as an amplified, delayed, and time-compressed replica of the input signal. If the input signal voltage is represented as $f(t)$ then the output signal voltage may be represented as $(a^2+a)f(at-t_d)/2$ where $a$ is greater then 1, and $f(t)$ is a time-limited nonperiodic signal of one cycle or else one cycle of a periodic signal, and $t$ is the delay experienced by the signal along its path from one end of the transmission line to the other.

A more detailed schematic circuit diagram of the invention is shown in FIG. 2 in which a signal 16 is sampled and applied to the variable reactance transmission line 18 which has its velocity of propagation controlled by reactance control unit 20.

The signal 16 is generated from a circuit 22, which may be for example, a plasma accelerator. In such a case the signal would be picked up from a probe which is near the plasma. The present invention may be used to display the transients which are induced on the probe on an oscilloscope 24 in which case a driver unit 26 must be used to apply the voltage to the circuit 22 for test purposes.

The voltage output 28 from the driver 26 is applied simultaneously to the test circuit 22 and to a frequency divider 30 which are electrically connected in parallel to the output of the driver 26. The frequency divider 30 produces a pulse at its output once for each four of the voltage pulses 28 that are applied to its input by the driver 26. These output pulses 32 from the frequency divider 30 are used to sample the signal 16 which is produced at the output from the test circuit 22 when it is driven by the pulses 28 and are also used to control the velocity of propagation of the variable reactance transmission line 18. They may also be used to control the oscilloscope or other display device 24.

The sampling pulses from the output of the frequency divider 30 are applied to a gate 34 through terminal 36 which is electrically connected to the output of the frequency divider 30. The output from the circuit under test 22 is also connected to the input of the gate 34 so that each time one of the pulses from the frequency divider 30 appears at the terminals 36, the signal 16 is gated to the output of gate 34. In this embodiment one out of four cycles of the signal 16 will be gated. The output of the gate 34 is connected to the input of the transmission line 18.

The pulses 32 from the output of the frequency divider 30 are also applied to the delay line 38 which is connected in parallel with the terminals 36 to the input of gate 34. This delay line slows down the pulses 32 so that the bias pulses 42 will not be applied to the variable transmission line 18 until after the sample of the input signal has entered the transmission line 18 itself. The pulse circuit 40 is electrically connected to the delay line 38 and produces a square bias voltage pulse 42 in response to each of the pulses 32 from the delay line 38. The output of the pulser 40 is connected to the primary winding 44 of the transformer 46 so as to receive the bias pulses 42. The secondary winding 48 of the transformer 46 is connected at one end to the propagation path 50 and at the other end to the propagation path 52, which propagation paths form a part of the variable reactance transmission line 18. The gate 34 is connected to the propagation path 54 of the variable reactance transmission line 18 so as to receive the sampled signal 56 from the gate 34 for amplification purposes.

The propagation path 54 includes a number of series inductors 57. A plurality of varactor diodes 58 have their anodes connected to propagation path 50 and their cathodes connected to the propagation path 54 along the length of the propagation path 54 and between the inductors 57 so as to provide a distributed capacitance. Also a plurality of similar varactor diodes 60 are connected in parallel between the propagation path 52 and the propagation path 54 with their cathodes connected to propagation path 52 and their anodes connected to propagation path 54 between the inductors 57 so as to form a common electrical path with the cathodes of the diodes 58 along the length of the propagation path 54. Of course, other voltage-variable capacitors may be used instead of the varactor diodes, such as capacitors having dielectric of rutile or barium titante. A resistor 62 is connected in series with the propagation path 50 at the end of the propagation path 50 which is farthest electrically from the input to the propagation path 54; and a resistor 64 is connected in series with the propagation path 52 at a point which is farthest electrically from the input to propagation path 54. The propagation paths 50 and 52 are connected together and grounded at point 66 on the far end of the resistors 62 and 64. A resistor 68 is connected between ground and the output terminal 70 of the variable reactance transmission line 18 at the far end of the propagation path 54.

The varactor diodes 58 are variable capacitance diodes which decrease their capacitance when biased in the backward direction. Consequently when the input signal 56 enters the propagation path 54 it enters it at a constant low velocity determined by the inductors 57 and the varactor diodes 58 and 60. A short time after the signal 56 enters the propagation path 54 the bias pulses 42 are applied to the varactor diodes 58 and 60 by way of the transmission lines 50 and 52 which have a high velocity of propagation. This causes the distributed capacitance as determined by the varactor diodes 58 and 60 to decrease rapidly.

The velocity of propagation of the line 18 is increased as the capacitance of the line decreases according to the relationship:

$$v_p=(LC)^{-1/2}$$

and the characteristic impedance of the line increases according to the relationship:

$$Z_0=(L/C)^{1/2}$$

where $v_p$ is the velocity of propagation of the variable reactance transmission line 18, $Z_0$ is the characteristic impedance of the line 18, L is the inductance of the line 18 per unit length, and C is the capacitance of the line 18 per unit length.

Since the inductance per unit length is fixed in the embodiments discussed here, an increase in velocity of propagation from an initial value $v_{p1}$ to a final value $v_{p2}$ is accompanied by an increase in characteristic impedance from an initial value $Z_{01}$ to a final value $Z_{02}$ such that one can define the dimensionless quantity $a$ by the relation:

$$a=v_{p2}/v_{p1}=Z_{02}/Z_{01}$$

Accordingly, a signal of voltage $f(t)$ applied to the input terminals of the line 18 has an input power of $f^2(t)/Z_{01}$ which travels forward along the line as a wave with velocity $v_{p1}$ until the time when the velocity of propagation and the characteristic impedance of the line increase rapidly by the factor $a$. This increase gives rise to a forward-traveling wave whose energy is $a(a+1)^2/4$ times that which the wave originally possessed and to a backward-traveling wave whose energy is $a(a-1)^2/4$ times that which the wave originally possessed. This backward-traveling wave must not be permitted in the equipment which uses the amplified forward-traveling wave, otherwise it will appear in the output as a time-delayed "ghost" waveform. When precautions against the backward-traveling wave are observed, the sudden change in the capacitance C per unit length, by the factor $a^{-2}$, causes an amplification of an input signal voltage $f(t)$ together with a time compression of the waveform such that the output voltage is approximately $a(a+1)f(at-t_d)/2$ where $t_d$ is equal to the time delay. The time-compression action of the amplifier can be compared with the operation of recording a signal on tape at low speed and then playing the tape back at high speed. The analogy is not exact, since it does not account for the backward-traveling wave, but it may be helpful.

In view of the limitations of existing nonlinear dielectric materials, the ability to cascade video parametric amplifiers may be quite important. However, in order to be of practical use, the cascading of such amplifiers must be effected in such a way as to eliminate the presence of "ghost" waveforms from the output of the last amplifier. The most straight-forward way of doing this, and the way that results in the greatest gain of the amplifier chain, is based on the fact that the desired output waveform is always completely discharged from the last variable transmission line before the first "ghost" waveform begins to make its appearance at the output terminals of the last amplifier. This fact suggests that the $Z_{01}$ of a given variable reactance transmission line in a chain of cascaded video parametric amplifiers be made equal to the $Z_{02}$ of the previous variable line in the chain, so that a signal can propagate from amplifier to amplifier without reflection, and that a gate be connected to the output of the last amplifier in the chain and to its bias pulse source so as to pass the desired output waveform and then block passage of the "ghost" waveforms that succeed it. This arrangement of components would result in an energy gain of approximately $[a(a+1)^2/4]^n$ for a chain of $n$ amplifiers in tandem. The small effects of resistors 62 and 64 have been neglected in the above discussion.

Since C varies such that the characteristic impedance of the line is one value $Z_{01}$ while the signal is entering the line and another value $Z_{02} \neq Z_{01}$ while the signal is leaving the line, reflectionless operation cannot be obtained, since the change in characteristic impedance generates a reflected signal which travels back to the input end of the variable velocity transmission line. However, the absence of this reflected signal from the output terminals of the variable velocity transmission line, can be assured if the impedance of the input circuitry is $Z_{02}$ and the impedance of the load is $Z_{02}$ also. It is therefore possible to to operate video parametric amplifiers in tandem without reflected "ghost" signals appearing in the output provided the $Z_{02}$ of one amplifier equals the $Z_{02}$ of the previous one. In view of the limitations of existing nonlinear dielectric and magnetic materials this ability to cascade video parametric amplifiers may be quite important.

There are a few considerations that are implicit in the above discussion but which perhaps should be emphasized. These are the following:

The velocity of propagation $v_p$ must change rapidly in time from a low to a high value, but at all times during this change $v_p$ must be uniform over the entire length of the line, and $v_p$ must be constant while the signal is entering the line and while the amplified signal is leaving the line. In other words, $v_p$ must change from its initial to its final value before the time-limited signal being amplified can travel the length of the line and should approximate a step function in form.

Terminal 70 which is the output terminal of the variable reactance transmission line 18 is connected to the input of the oscilloscope 24. The output pulses are shown as indicated by 72. The sweep of the oscilloscope 24 is triggered by the pulses 32 from the frequency divider 30 which is connected to terminal 74 in parallel with the delay line 38 and the terminal 36 of gate 34. In the embodiment of FIG. 2 every fourth cycle of the signals, which are generated by a circuit which is triggered by a periodic driver, is amplified. The others are blocked from entering the amplifying line 18 so that the line can operate on a preferred cycle as though it were a single time-limited waveform. The number of cycles blocked from entering the line should be sufficient to give the line time to change velocity, discharge itself through the loads at its two ends, and be reset to its original low velocity state.

The resistors 62 and 64 are equal to each other and very much smaller then the characteristic impedance of the transmission line 18. The signal going through the gate 34 and entering the line 18 sees an unbalanced line of the characteristic impedance of line 18 in series with a resistance equal to one-half of the resistance of the resistor 62 to ground. This unbalanced line is a lumped approximation of a tri-plate transmission line. The bias pulses appearing on secondary winding 48 of transformer 46 see a balanced load consisting of a resistor having a resistance equal to twice that of the resistor 62 together with a number of varactor diode series-pairs, all connected in parallel. The effective load between the signal output terminal 70 of the line 18 and ground is shown as resistor 68 and should be such a value that the output of the end of the line is matched. This prevents reflections of the amplified signal. For the schematic circuit of FIG. 2 the resistance of resistor 68 should be the characteristic impedance of the next line cascaded with 18 plus half of the resistance of the resistor 62.

The operation of amplifying line 18 requires that there be a source of strong signals synchronized with the periodic signals to be amplified. This requirement prevents the line 18 from being used to amplify received radio signals, but the line can be used for radar reception and for most laboratory applications involving weak periodic or time-limited waveforms. The arrangement of FIG. 2 can be modified for amplification of time-limited, triggered, nonrepetitive transients by the removal of the frequency divider 30.

The invention described above is a two-port active device whose output is an amplified, delayed and time-compressed replica of the input signal. This provides broad band amplification of high frequency signals with an extremely low noise factor. It is a relatively simple and uncomplicated device for such amplification.

Obviously many modifications and variations of the present invention are possible in the light of the above teachings. It is therefore to be understood that within the scope of the appended claims the invention may be practiced otherwise than as specifically described.

What is claimed is:

1. Apparatus for determining the waveform of a low voltage which appears on a specimen when a driving voltage is applied to said specimen, comprising:

a low velocity of propagation path for electric voltages, having an input terminal for receiving an electric signal and an output terminal for providing an amplified replica of said signal;

a circuit to be tested having an input and an output;

a gate means having a gate input and an output and signal input, said gate output being connected to said input terminal of said low velocity propagation path;

a high velocity-of-propagation path;

a plurality of variable-capacitance diodes electrically connected in parallel between said high velocity-of-propagation path and said low velocity-of-propagation path along the length of said low velocity-of-propagation path;

means for applying a voltage to said high velocity-of-propagation path after said electric signal has entered said low velocity-of-propagation path and for maintaining said voltage constant as the amplified replica of said electric signal leaves said output terminal said means for applying a voltage comprising:

a driver means for supplying pulses, said driver means having an output;

a frequency divider means having an output and an input, said divider input being connected to said driver means output;

a delay means having an output and an input, said delay means input connected to said frequency divider means output;

a pulser means having an input and an output coupled to said high velocity of propagation path and said pulser means input being connected to said delay means output, said gate means input being connected to said frequency divider output and said circuit to be tested having its input connected to said driver means output and its output connected to said gate means signal input; and indicating means having an input connected to said output terminal of said low velocity of propagation path.

2. Apparatus for determining the waveform of a low voltage which appears on a specimen when a driving voltage is applied to said specimen, comprising:

a highly inductive transmission line having an input terminal at one end, having an output terminal at the other end and having a plurality of diode terminals spaced along said line between said input terminal and said output terminal;

a circuit to be tested having an input and an output;

a gate means having a gate input, an output and a signal input, said gate output being connected to said input terminal of said highly inductive transmission line;

first and second low reactance transmission lines each having a bias input terminal;

said bias input terminals being adapted to receive a bias voltage across them;

bias voltage generating means comprising:

a driver means for supplying pulses having an output;

a frequency divider means having an output and an input, said frequency divider input being connected to said driver means output;

a delay means having an output and an input, said delay input being connected to said frequency divider means output;

a pulser means having an input and an output, said pulser output being connected to said bias input terminals, said pulser means input being connected to said delay means output, said gate means input being connected to said frequency divided output and said circuit to be tested having its input connected to said driver means output and its output connected to said gate means signal input;

a first plurality of variable capacitance diodes each having its cathode connected to a different diode terminal on said highly inductive transmission line and each having its anode connected to said first low reactance transmission line;

a second plurality of variable capacitance diodes each having its anode connected to a different diode terminal on said highly inductive transmission line so as to be electrically connected in series to one of said first plurality of variable capacitance diodes and each having its cathode connected to said second low reactance transmission line;

whereby when said bias voltage is applied to said bias input terminals with the positive potential at the bias input terminal of said first low reactance transmission line the capacitance of said highly inductive transmission line is decreased so as to raise its velocity of propagation; and indicating means having an input connected to output terminal of said highly inductive transmission line.

3. Apparatus for determining the waveform of a low voltage which appears on a specimen when a driving voltage is applied to said specimen, comprising:

electrical terminal means, connected to said specimen, for receiving a voltage output from said specimen when said specimen is subjected to said driving voltage;

connecting means to electrically connect the output from a voltage source to said specimen so as to provide a driving voltage to said specimen;

a gate means having a gate input, a signal input and an output gate means, said signal input being connected to said terminal means of said specimen;

a highly inductive transmission line electrically connected to said gate means output at one end;

having an output terminal at the other end and having a plurality of diode terminals spaced along said transmission line between said one end and said output terminal;

first and second low reactance transmission lines each having a bias input terminal;

said bias input terminals being adapted to receive a bias voltage across them;

bias voltage generating means comprising, a driver means for supplying a driving voltage having an output;

a frequency divider means having an output and an input, said frequency divider input being connected to said driver means output;

a delay means having an output and an input whose input is connected to said frequency divider means output;

a pulser means having an input and an output, said pulser output being connected to bias input terminals, said pulser means input being connected to said delay means output, said gate means input being connected to said frequency divided output;

a first plurality of variable capacitance diodes each having its cathode connected to a different diode terminal on said highly inductive transmission line and each having its anode connected to said first low reactance transmission line;

a second plurality of variable capacitance diodes each having its anode connected to a different terminal on said highly inductive transmission line so as to be electrically connected in series to one of said plurality of variable capacitance diodes and each having its cathode connected to said second low reactance transmission line, whereby when said bias voltage is applied to said bias input terminals with the positive potential at the bias input terminal of said first low reactance transmission line the capacitance of said highly inductive transmission line is decreased so as to raise its velocity of propagation; and a display device, electrically connected to said output terminal of said highly inductive transmission line, for displaying the amplified replica of said low voltage which appears on said specimen when said driving voltage is applied.

References Cited by the Examiner

UNITED STATES PATENTS 2,566,699 9/1951 Frommer ---------- 324—57 X 3,177,433 4/1965 Simon et al.

WALTER L. CARLSON, *Primary Examiner.*

E. E. KUBASEIWICZ, *Assistant Examiner.*